(12) United States Patent
Miron

(10) Patent No.: US 6,720,907 B1
(45) Date of Patent: Apr. 13, 2004

(54) METHOD AND SYSTEM FOR DETECTING AND DETERMINING SUCCESSFUL INTERCEPTION OF MISSILES

(75) Inventor: Raphael Miron, Haifa (IL)

(73) Assignee: Rafael-Armament Development Authority Ltd., Haifa (IL)

(*) Notice: Subject to any disclaimer, the term of this patent is extended or adjusted under 35 U.S.C. 154(b) by 0 days.

(21) Appl. No.: 10/436,309

(22) Filed: May 12, 2003

(30) Foreign Application Priority Data

May 15, 2002 (IL) .................................. 149683

(51) Int. Cl.$^7$ .............................. G01S 7/00; G01S 13/00
(52) U.S. Cl. .............................. 342/52; 342/53; 342/54; 342/55; 342/58; 342/60; 342/61; 342/62; 342/104; 342/118; 342/175; 342/195; 342/59
(58) Field of Search ..................... 244/3.1–3.3; 356/3, 356/3.01–5.15; 342/27, 28, 52, 53–67, 73–81, 89, 94–103, 118, 146, 147, 157, 158, 175, 192–197, 104–115, 119, 126, 127, 145; 89/1.11; 701/300, 301, 302

(56) References Cited

U.S. PATENT DOCUMENTS

| | | | | |
|---|---|---|---|---|
| 4,726,224 A | * | 2/1988 | D'Ausilio | 244/3.15 |
| 5,340,056 A | * | 8/1994 | Guelman et al. | 244/3.16 |
| 5,381,156 A | * | 1/1995 | Bock et al. | 342/59 |
| 5,406,290 A | * | 4/1995 | James et al. | 342/119 |
| 5,464,174 A | * | 11/1995 | Laures | 244/3.11 |
| 5,862,496 A | * | 1/1999 | Biven | 244/3.11 |
| 5,866,837 A | * | 2/1999 | Biven et al. | 89/1.11 |
| 5,917,442 A | * | 6/1999 | Manoogian | 342/62 |
| 6,021,975 A | * | 2/2000 | Livingston | 244/3.11 |
| 6,250,583 B1 | * | 6/2001 | Livingston | 244/3.13 |
| 6,343,766 B1 | * | 2/2002 | Livingston | 244/3.13 |
| 6,527,222 B1 | * | 3/2003 | Redano | 244/3.14 |
| 6,549,158 B1 | * | 4/2003 | Hanson | 342/62 |
| 6,563,450 B1 | * | 5/2003 | Wallace | 342/62 |
| 6,603,421 B1 | * | 8/2003 | Schiff et al. | 342/62 |

* cited by examiner

*Primary Examiner*—Bernarr E. Gregory
(74) *Attorney, Agent, or Firm*—Reed Smith LLP; William H. Dippert

(57) ABSTRACT

A system for the detection and determination of the success of interception of incoming missiles, used in conjunction with a defense weapon system capable of identifying and tracking incoming missiles and interceptors. The system comprises at least one of a plurality of sensing units. Each sensing unit comprises: an optical sensor for detecting optical signals within a predetermined range; tracking means coupled to the optical sensor for tracking an intercepting missile or an incoming missile; processing means for processing optical input detected by the optical sensor and analyzing the optical input to identify an optical signature and determine detonation of interceptor or incoming missile; communicating means for communicating data between the sensing unit and the defense weapon system; and control means for controlling the tracking means, the processing means and the communicating data.

22 Claims, 2 Drawing Sheets

METHOD AND SYSTEM FOR DETECTING AND DETERMINING SUCCESSFUL INTERCEPTION OF MISSILES

FIELD OF THE INVENTION

The present invention relates to defense systems. More particularly it relates to device and method for kill assessment of intercepted missiles.

BACKGROUND OF THE INVENTION

Defense systems against surface-to-surface (SS) missiles are designed to destroy or incapacitate the warhead of an incoming SS missile. Most defense systems achieve this task by means of launching a kill vehicle (hereinafter referred to as "interceptor") to intercept the incoming SS missile. The warhead kill in this case, is achieved by a direct impact of the interceptor with the incoming SS missile or by detonating a warhead fitted into the interceptor at the time of interception. Other defense systems may employ directed energy to destroy an incoming missile warhead. A warhead kill is determined according to its contents. SS missiles warheads are commonly classified into four main categories: high explosive, chemical, biological and nuclear. A warhead kill for a high explosive or a nuclear missile, which also contains a significant amount of high explosive, is defined as a detonation of the high explosive of the SS missile warhead within a short time (typically less than a second) after interception. A warhead kill for a chemical or biological missile, which contains some form of liquid or gas, is defined as the breakdown of the warhead structure and dispersion of its contents within a short time (up to a few seconds) after interception. Due to the high cost and limited availability of interceptors or energy sources, especially under massive attack scenarios, it is imperatively crucial to determine the result of the interception as soon as possible (within a few seconds), in order to decide whether it is necessary to launch another interceptor or direct another shot at the same targeted SS missile. Furthermore, any information as to the type of incoming warhead is of great importance for civil defense and intelligence purposes.

Current defense systems suffer from operational problems because of their inability to provide a reliable warhead kill assessment. Current kill assessment methods are based on the following two approaches:

a) One kill assessment method is an automatic computerized evaluation of kill probability, based on the interceptor performance envelope, and according to pre interception radar data. This criteria suffers from severe limitations because of the following reasons:

1) Warhead kill probability is highly sensitive to the very last stage of interception commonly referred to as the "End game". The important parameters of the end game are beyond the observation capabilities of the defense system radar. Therefore, this highly important interception data can not be considered during real time kill assessment calculations.

2) The performance envelope is statistically constructed for a finite set of interception scenarios conceived by the manufacturer, and varies for different target types. A single operational interception event does not necessarily follow any of these scenarios. (as was evident during the gulf war in 1991, when attempts were made to intercept scud missiles by patriot missiles)

3) There is no certainty that defense system can reliably classify, in real time, the type of the attacking SS missile. Wrong target type classification will lead to wrong selection of performance envelope for evaluation.

4) Since the characteristics of the incoming SS missile, which constitute the basis for the performance envelope calculations are based, mainly, on intelligence sources, there is no certainty that they are indeed accurate and reliable.

b) The second kill assessment method is based on operator observation of the target radar track behavior immediately following the interception. The purpose of this observation is to identify whether the target has disappeared or there has been a noticeable change in its trajectory or velocity in a way that can be reliably interpreted as a successful warhead kill. This second criteria suffers from even greater limitations than the first as was evident during the gulf war of 1991.

1) During the Gulf War scud missiles disintegrated during reentry into the atmosphere around the zone where most of the interceptions took place. As a result, not only that the targets did not disappear from the radar, actually they turned into a cluster of targets formed from the debris of the disintegrated missile. This cluster of targets continued its descent in a trajectory almost identical to the trajectory of the missile prior to its disintegration for a considerable amount of time. Identifying the warhead among these clusters is practically impossible making effective warhead kill assessment practically impossible.

This problem is not restricted to Gulf War scud missiles, but is highly relevant for normal interceptions where the incoming missile will probably disintegrate as a result of being hit by the interceptor. In such a case it would be practically impossible to determine in a high degree of reliability whether the warhead was successfully destroyed or the SS missile merely disintegrated, leaving a live warhead to descent in its trajectory towards a ground target.

2) Another limitation stems from the fact that operator's decisions are subjective, their quality substantially influenced by the operator's experience and skill in determining successful kills. This limitation is enhanced by the fact that there is very limited ability to reliably predict the behavior of an SS missile or its debris after interception under various scenarios. Thus it is extremely difficult if not entirely impossible to provide computer simulation for training radar operators in such scenarios.

There is therefore a need to provide a reliable system and method for real time warhead kill assessment for SS missiles.

BRIEF DESCRIPTION OF THE INVENTION

An aim of the present invention is to provide a reliable system and method for detecting and determining successful interception of missiles.

It is therefore thus provided, in accordance with a preferred embodiment of the present invention, a system for the detection and determination of the success of interception of incoming missiles, used in conjunction with a defense weapon system capable of identifying and tracking incoming missiles and interceptors, the system comprising at least one of a plurality of sensing units, each unit comprising:

an optical sensor for detecting optical signals within a predetermined range;

tracking means coupled to the optical sensor for tracking an intercepting missile or an incoming missile;

processing means for processing optical input detected by the optical sensor and analyzing the optical input to identify an optical signature and determine detonation of interceptor or incoming missile;

communicating means for communicating data between the sensing unit and the defense weapon system;

control means for controlling the tracking means, the processing means and the communicating data.

Furthermore, in accordance with a preferred embodiment of the present invention, the tracking means uses location, speed, angular or range data obtained from the defense weapon system for tracking.

Furthermore, in accordance with a preferred embodiment of the present invention, the optical sensor is capable of detecting intensity of the optical signature and the processing means determines detonation based on the intensity of the optical signature.

Furthermore, in accordance with a preferred embodiment of the present invention, the processing means further includes a database of spectral signatures of various substances that may be contained in a warhead for comparison with the detected optical signature.

Furthermore, in accordance with a preferred embodiment of the present invention, the system includes a number of sensing units at least as many interceptors the defense weapon system handles.

Furthermore, in accordance with a preferred embodiment of the present invention, the optical sensor is a CCD camera.

Furthermore, in accordance with a preferred embodiment of the present invention, the optical sensor is a forward looking infrared (FLIR) camera.

Furthermore, in accordance with a preferred embodiment of the present invention, the optical sensor is a radiometer.

Furthermore, in accordance with a preferred embodiment of the present invention, the radiometer is a spectrometer radiometer.

Furthermore, in accordance with a preferred embodiment of the present invention, the radiometer is a radiometer operational in a variety of spectral ranges.

Furthermore, in accordance with a preferred embodiment of the present invention, the system is airborne.

Furthermore, in accordance with a preferred embodiment of the present invention, the system is located in space.

Furthermore, in accordance with a preferred embodiment of the present invention, the system is located at sea.

Furthermore, in accordance with a preferred embodiment of the present invention, the system is located on ground.

Furthermore, in accordance with a preferred embodiment of the present invention, there is provided a method for the detection and determination of the success of interception of incoming missiles, used in conjunction with a defense weapon system capable of identifying and tracking incoming missiles and interceptors, the method comprising:

providing at least one of a plurality of sensing units, each unit comprising:

an optical sensor capable of detecting optical signals within a predetermined range;

tracking means coupled to the optical sensor capable of tracking an intercepting missile or an incoming missile;

processing means for processing optical input detected by the optical sensor and analyzing the optical input to identify an optical signature and determine detonation of interceptor or incoming missile;

communicating means for communicating data between the sensing unit and the defense weapon system;

control means for controlling the tracking means, the processing means and the communicating data;

tracking an interceptor or an incoming missile; identifying optical signature of a suspected interception event;

determining the occurrence of a successful interception in the existence of a predefined set of criteria.

Furthermore, in accordance with a preferred embodiment of the present invention, tracking the interceptor or incoming missile is carried out using video data obtained from the optical sensor.

Furthermore, in accordance with a preferred embodiment of the present invention, tracking the interceptor or incoming missile is carried out using location, speed ,angular or range data obtained from the defense weapon system.

Furthermore, in accordance with a preferred embodiment of the present invention, the optical signature of the suspected interception event is compared with optical signatures stored in a database containing optical signatures of various substances.

Furthermore, in accordance with a preferred embodiment of the present invention, the time lapsed between two closely occurring in time optical signatures is measured to determine the separate detonation of the interceptor and the incoming missile.

Furthermore, in accordance with a preferred embodiment of the present invention, the predefined set of criteria include an analysis in terms of time and amplitude of optical signatures that are sensed and detected, where the detonation of the interceptor warhead alone is detected as a single optical signature, whereas the incoming missile's warhead detonation is reflected as a second optical signature, in a time interval befitting to the distance between the interceptor and the incoming missile upon activation of the interceptor warhead, flight time of the warhead fragments, and the detonation process of the incoming missile.

Finally, in accordance with a preferred embodiment of the present invention, the predefined set of criteria include determination of a successful interception by detecting a single optical signature immediately following interception, having the intensity or spectral characteristics typical to a warhead detonation.

BRIEF DESCRIPTION OF THE FIGURES

In order to better understand the present invention, and appreciate its practical applications, the following Figures are provided and referenced hereafter. It should be noted that the Figures are given as examples only and in no way limit the scope of the invention as defined in the appending Claims. Like components are denoted by like reference numerals.

DETAILED DESCRIPTION OF THE INVENTION AND FIGURES

The present invention seeks to provide a system and method for detecting and determining a successful interception, based on electro-optic sensing of the interception event.

An aspect of the present invention is the provision of an electro-optic sensor whose line of sight is directed at the anticipated interception site in the sky, its direction automatically governed by a controller receiving direction data from the radar of the interception system and tracking the interceptor or incoming missile until the interception stage, or by being directed toward the interceptor launching area and tracking the interceptor following its launch.

Another aspect of the present invention is the provision of a diagnostic process incorporated in the system that commences shortly before the interception and ends shortly after that interception (preferably in a matter of a few seconds), to determine the success of the interception.

Figure 1:
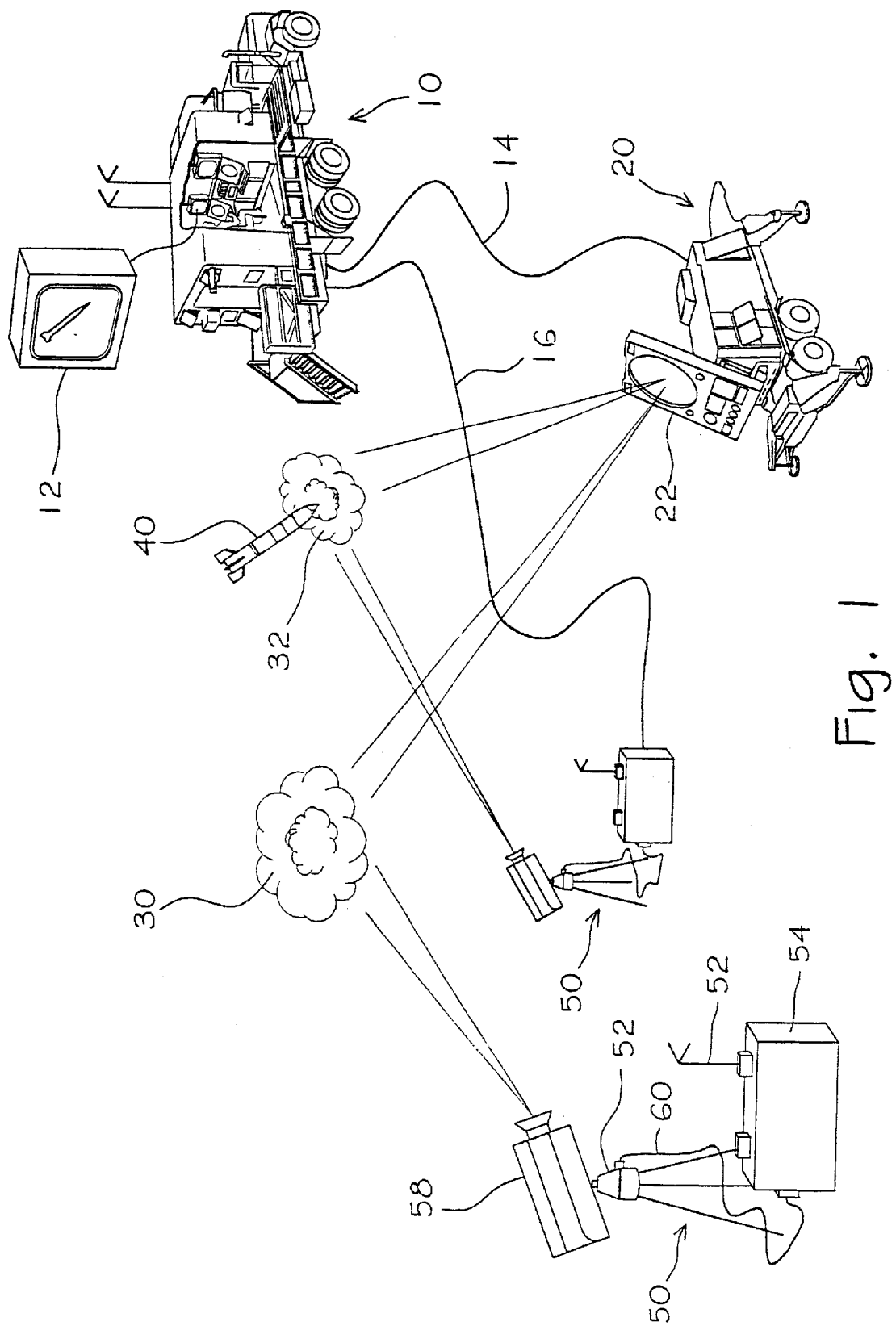
FIG. 1 illustrates a general view of the elements in a system for detecting and determining a successful interception of missiles in accordance with a preferred embodiment of the present invention.

Reference is now made to FIG. 1, illustrating a general view of the elements in a system for detecting and determining a successful interception of missiles in accordance with a preferred embodiment of the present invention.

A defense system command unit 10 for controlling a defense weapon system such as a patriot missiles battery or Arrow (a product of the Israeli Aviation Industry) missiles battery, or other missile defense weapon system is provided and communicates via communication wire 14, or via wireless communication with a tracking system 20, such as a radar 22, for tracking multiple missile targets. The command unit is preferably equipped with a monitor 12 on which video and other information can be displayed.

At least one, but preferably a battery of a plurality of electro-optic imaging and tracking units 50 are deployed, each unit comprising optical sensor 58, capable of tracking an object flying in the sky by means of a motorized tracker 52, preferably positioned on a pedestal, here tripod 60 or on a podium. Motorized tracker 52 is controlled by a control unit 54, which includes, inter alia, radiometer or radiometer-spectrometer, data processing unit (53 see FIG. 2) and communication link (55 in FIG. 2) to the defense system command unit 10 or to the tracking unit 20, either by wires 16, and/or wireless communication via antenna 56. The control unit also includes a controller for controlling the motorized tracker and controlling the optical sensor. The optical sensor 58 can be an imaging sensor such as a CCD camera, or a FLIR (Forward Looking Infra Red) sensor, such as the one marketed under the brand name "flame" and installed in the "Litening" system manufactured by Refael, Israel, or a radiometer, operational in a single or a variety of spectral ranges, such as the one marketed under the name "Orion" by CEDIP (France). The tracking system can be for example the tracking system marketed under the brand name "Toplite" by Refael, Israel.

Typical communication transmitted from the optical sensor battery to the command unit would include information such as video, and/or diagnostic results, and status report, whereas a typical communication between the command unit and the optical sensor battery would include target and/or interceptor location and/or angular position, and/or, range, and/or speed data, and operator commands, like change mode, spectral, imaging, sound, day/night status, on-off and other defined commands.

A typical diagnostic process has the following characteristics:
1. For an interceptor fitted with a warhead—Determination of the interceptor's warhead detonation is achieved by detecting and identifying a distinct optical and/or thermal signature, typical of a high explosive detonation in terms of intensity and/or spectral content (note that thermal signature is a form of an optical signature, picked up by IR optical sensors), such as by comparing it with the known signatures of that type of warhead (data that may be provided by the manufacturer or obtained by conducting appropriate tests on the interceptor's warhead). For an interceptor without a warhead this step does not apply.
2. For an incoming missile fitted with a high explosive or nuclear warhead—Determination of the detonation of the incoming missile's warhead 40—by detecting and identifying an optical and/or thermal signature typical of a high explosive detonation in terms of intensity and/or spectral content, shortly after the intercept or directed energy shot.
3. For an incoming missile fitted with a chemical or biological warhead Detection and/or identification of a cloud of spray or aerosol or gas of chemical substances, biological substances or nuclear substances that spread as a result of the destruction of the warhead, by means of a spectral analysis (distinct emission or absorption spectral lines depending on the composition of the substance).

The process should preferably produce a decision whether the interception was successful or failed, or provide the probability that a warhead kill occurred. It is suggested that the criteria for determining the success an interception include:
1. Analysis in terms of time and amplitude—the intensity and timing of the light pulses 30, 32, that are sensed and detected, where the detonation of the interceptor warhead alone (leaving the incoming warhead intact) would be detected as a single pulse, whereas the incoming missile's warhead detonation would be reflected as a second pulse, in a time interval befitting to the distance between the interceptor and the incoming missile upon activation of the interceptor warhead, flight time of the warhead fragments, and the detonation process of the incoming missile. In the case of a hit-to-kill interceptor or a directed energy weapon, a single light pulse immediately following the interception, having the intensity and/or spectral characteristics typical to a warhead detonation will serve as indication of a successful intercept.
2. Analysis in terms of time and wavelength—detecting spectral lines characteristic of a specific chemical, biological or nuclear substances, or to burning gases of the explosives of the incoming missile warhead (or in the absence of verified information, the detection of spectral lines that are not associated with the interceptor's known signature.

Figure 2:
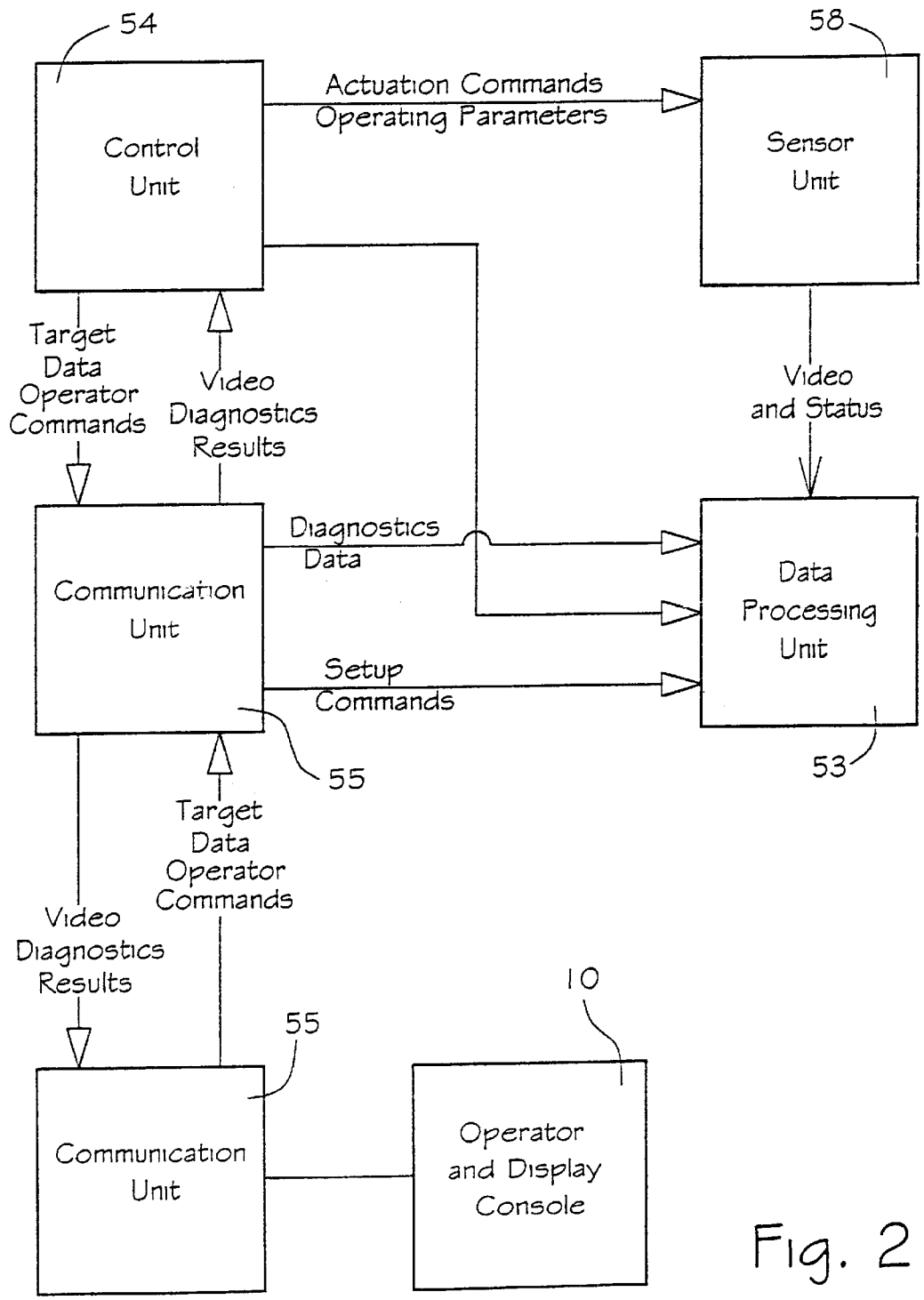
FIG. 2 is a block diagram illustrating typical components of a system for detecting and determining a successful interception of missiles in accordance with a preferred embodiment of the present invention, and their interrelation.

FIG. 2 is a block diagram illustrating typical components of a system for detecting and determining a successful interception of missiles in accordance with a preferred embodiment of the present invention, and their interrelation.

The number of sensing units should be determined according to the number of intercepts that may be handled simultaneously, the more sensing units the more targets may be monitored.

The system of the present invention may be airborne, located on the ground, or on a marine vessel at sea. It may also be positioned in space.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

What is claimed is:
1. A system for the detection and determination of the success of interception of incoming missiles, used in conjunction with a defense weapon system capable of identi- fying and tracking incoming missiles and interceptors, the system comprising at least one of a plurality of sensing units, each unit comprising:
- an optical sensor for detecting optical signals within a predetermined range;
- tracking means coupled to the optical sensor for tracking an intercepting missile or an incoming missile;
- processing means for processing optical input detected by the optical sensor and analyzing the optical input to identify an optical signature and determine detonation of interceptor or incoming missile;
- communicating means for communicating data between the sensing unit and the defense weapon system;
- control means for controlling the tracking means, the processing means and the communicating data.

2. The system as claimed in claim 1, wherein the tracking means uses location, speed, angular or range data obtained from the defense weapon system for tracking.

3. The system as claimed in claim 1, wherein the optical sensor is capable of detecting intensity of the optical signature and the processing means determines detonation based on the intensity of the optical signature.

4. The system as claimed in claim 1, wherein the processing means further includes a database of spectral signatures of various substances that may be contained in a warhead for comparison with the detected optical signature.

5. The system as claimed in claim 1, wherein the system includes a number of sensing units at least as many interceptors the defense weapon system handles.

6. The system as claimed in claim 1, wherein the optical sensor is a CCD camera.

7. The system as claimed in claim 1, wherein the optical sensor is a forward looking infrared (FLIR) camera.

8. The system as claimed in claim 1, wherein the optical sensor is a radiometer.

9. The system as claimed in claim 8, wherein the radiometer is a spectrometer radiometer.

10. The system as claimed in claim 8, wherein the radiometer is a radiometer operational in a variety of spectral ranges.

11. The system as claimed in claim 1, wherein the system is airborne.

12. The system as claimed in claim 1, wherein the system is located in space.

13. The system as claimed in claim 1, wherein the system is located at sea.

14. The system as claimed in claim 1, wherein the system is located on ground.

15. A method for the detection and determination of the success of interception of incoming missiles, used in conjunction with a defense weapon system capable of identifying and tracking incoming missiles and interceptors, the method comprising:
- providing at least one of a plurality of sensing units, each unit comprising:
  - an optical sensor capable of detecting optical signals within a predetermined range;
  - tracking means coupled to the optical sensor capable of tracking an intercepting missile or an incoming missile;
  - processing means for processing optical input detected by the optical sensor and analyzing the optical input to identify an optical signature and determine detonation of interceptor or incoming missile;
  - communicating means for communicating data between the sensing unit and the defense weapon system;
  - control means for controlling the tracking means, the processing means and the communicating data;
  - tracking an interceptor or an incoming missile; identifying optical signature of a suspected interception event;
  - determining the occurrence of a successful interception in the existence of a predefined set of criteria.

16. The method as claimed in claim 15, wherein tracking the interceptor or incoming missile is carried out using video data obtained from the optical sensor.

17. The method as claimed in claim 15, wherein tracking the interceptor or incoming missile is carried out using location, speed angular or range data obtained from the defense weapon system.

18. The method as claimed in claim 15, wherein the optical signature of the suspected interception event is compared with optical signatures stored in a database containing optical signatures of various substances.

19. The method as claimed in claim 15, wherein the time lapsed between two closely occurring in time optical signatures is measured to determine the separate detonation of the interceptor and the incoming missile.

20. The method as claimed in claim 19, wherein the predefined set of criteria include an analysis in terms of time and amplitude of optical signatures that are sensed and detected, where the detonation of the interceptor warhead alone is detected as a single optical signature, whereas the incoming missile's warhead detonation is reflected as a second optical signature, in a time interval befitting to the distance between the interceptor and the incoming missile upon activation of the interceptor warhead, flight time of the warhead fragments, and the detonation process of the incoming missile.

21. The method as claimed in claim 19, wherein the predefined set of criteria include determination of a successful interception by detecting a single optical signature immediately following interception, having the intensity or spectral characteristics typical to a warhead detonation.

22. The method as claimed in claim 19, wherein the predefined set of criteria include an analysis in terms of time and wavelength, detecting spectral lines characteristic of a specific chemical, biological or nuclear substances, or to burning gases of the explosives of the incoming missile warhead, or in the absence of verified information, the detection of spectral lines that are not associated with the interceptor's known signature.

* * * * *